Nov. 11, 1924.
N. W. STORER
LOCOMOTIVE GIRDER
Filed Dec. 27, 1922
1,515,228
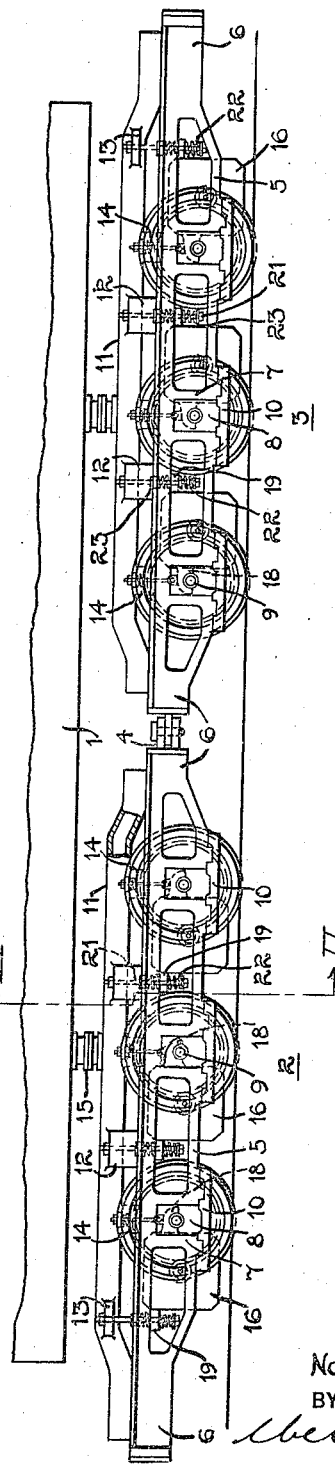
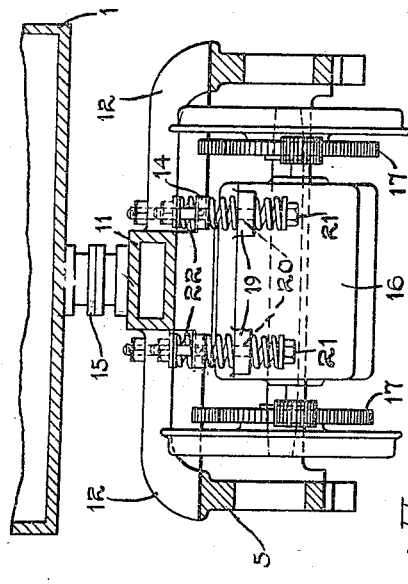
WITNESSES:
O. M. Cochran
W. B. Jaspert
INVENTOR
Norman W. Storer.
BY
Wesley G. Carr
ATTORNEY Patented Nov. 11, 1924.

1,515,228

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

LOCOMOTIVE GIRDER.

Application filed December 27, 1922. Serial No. 609,213.

*To all whom it may concern:*

Be it known that I, NORMAN W. STORER, a citizen of the United States, and a resident of Pittsburgh, in the county of Allegheny and State of Pennsylvania, have invented a new and useful Improvement in Locomotive Girders, of which the following is a specification.

My invention relates to electric locomotives, more especially to the truck-body portions thereof.

It is among the objects of this invention to provide electric-locomotive-truck supports that shall be adapted for the mounting of a plurality of driving motors in an expedient and efficient manner; be of simple and durable mechanical construction and be so designed as to distribute the loading and stressing of the members to portions of the truck body that are best adapted to carry them.

In railway trucks of previous types, in which the motors were geared directly to the axles, one side of each motor was supported by the driving axle to which it was geared by means of suitable axle bearings that were adapted to carry the weight and maintain the distance between gear centers. The other side of the motor was usually spring borne, through some form of nose suspension, from a truck cross tie. In the case of a heavy freight locomotive, for example, the weight carried by the axle was excessive. In order to relieve the axle from dead weight, mountings of various types for suspending the motors from the frame structure of the locomotive trucks have been proposed.

My present invention is directed to a means for so mounting the driving motors of electric locomotives as to relieve the driving axles of dead weight without effecting undue stressing of the frame members. This is accomplished by providing a superstructure comprising a box girder which extends from the bumper ends of the respective trucks above the side frames thereof and which is provided with a plurality of transverse tie rods to properly reinforce it and to provide mounting the brackets from which the motors are suspended.

The box-girder construction may consist of a hollow frame member disposed longitudinally of the truck between the side frames thereof and constituting a conduit for conducting a cooling blast of air from a blower in the cab to the driving motors.

In the accompanying drawing, constituting a part hereof and in which like reference characters designate like parts, Figure 1 is a side elevational view of a pair of articulated trucks embodying the principles of this invention, showing a fragmentary portion of a cab mounted thereon; and Fig. 2 is a cross-sectional view thereof taken along the line II—II of Fig. 1.

Referring to Fig. 1, the locomotive comprises the usual cab or body portion 1 mounted on a pair of articulated trucks 2 and 3 that are connected by a suitable hinge 4 to provide freedom of articulation therebetween. The truck members 2 and 3 respectively comprise the usual truck-frame construction consisting of a pair of parallel side frames 5, cross-connected by a plurality of tie-rods and provided, at their respective ends, with suitable bumper frames 6. The side frames 5 are provided with vertical pedestal jaws 7 adapted to movably secure journal boxes 8 in which the wheel axles 9 are journaled. The journal box 8 is retained in the pedestal jaws by a longitudinal binder 10 secured to the lower rails of the side frames 5.

A box girder 11, of hollow-frame construction, is disposed centrally and longitudinally of the side frames 5 and is secured to the truck body at the bumper ends 6. The box girder 11 is so shaped as to raise it above the side frames of the truck to provide sufficient clearance for the driving mechanism. The girder 11 is provided with a plurality of transverse tie bars 12 which may be integral therewith to rigidly secure it to the frames and is further provided with a plurality of transversely projecting lugs 13 and 14 from which driving motors are suspended. A center bearing 15 for each truck is provided between the sub-frame of the cab body 1 and the box girder 11 to permit rotative movement of the truck with respect to the cab.

A plurality of drive motors 16 are geared to the axles 9 by drive gears 17, and one end of each motor is provided with a suitable axle bearing 18 to engage the corresponding axle. The motor frame is provided with suitable lugs or brackets 19 having openings 20 to receive bolts 21 which are suspended from the tie bars 12 or lugs 13. The bolts 21 are provided with coil springs 22 on the respective sides of the lugs 19 and have collars 23 to retain the springs in their respective positions. The axles 9 are largely relieved from weights of the motors 16 by rod and spring suspensions corresponding to those for the lugs 19, they being interposed between the motor-axle bearings 18 and the lugs 14 of the box girder 11. The girders 11 may be connected across the point of articulation between the trucks by a flexible connection to form a continuous conduit between a source of air under pressure—such as a blower mounted in the locomotive cab—and the respective motors for cooling the latter.

It will be understood from the above description of my invention that the box-girder-frame construction for mounting the driving motors of an electric locomotive and the center bearing mounting between the locomotive body and girder provide a more desirable distribution of load than was heretofore possible and also greatly relieve the stressing from the main frame of the truck body. The spring-borne motor greatly reduces the dead weight on the drive axles which was practically concentrated thereon in motor suspensions of prior types. The box girder illustrated is so constructed as to add no considerable weight to the truck and has the additional function of conducting air to the driving motors.

Although I have described a specific embodiment of my invention, it will be obvious to those skilled in the art that various modifications may be made in the details of construction. For instance, the box-girder construction may be modified to include two parallel girders extending above the side frames of the truck and secured to the bumper frame instead of the single member shown, and the particular shape and design of the box girder, the method of mounting it upon the truck frame and the details of the springs and bolts employed may be altered to accommodate the conditions of service requirements. These and other changes may be made without departing from the principles herein set forth.

I claim as my invention:

1. The combination with an electric-locomotive truck, of a motor-suspension means comprising a box girder disposed longitudinally of the side frames of said truck and secured, at its respective ends, to the bumper frames thereof.

2. The combination with an electric-locomotive truck, of a motor-suspension means comprising a box girder extending longitudinally from the respective bumpers of said truck.

3. The combination with an electric-locomotive truck, of a motor-suspension means comprising a box girder having a plurality of reinforcing tie-rods which are adapted to support a plurality of motors.

4. The combination with an electric-locomotive truck, of a motor-suspension means comprising a box girder extending from the respective bumpers of said truck parallel with the side frames thereof, said girder comprising a hollow beam provided with a plurality of tie-rods extending to the side frames of the truck and having transverse projections adapted to yieldingly support a motor.

5. The combination with an electric-locomotive truck, of a motor-suspension means comprising a box girder extending from the respective bumpers of said truck parallel with the side frames thereof, said box girder comprising a hollow longitudinal beam provided with a center bearing and a plurality of tie-rods, said girder being adapted to support one side of a plurality of motors.

6. The combination with an electric-locomotive truck, of a motor-suspension means comprising a box girder extending from the respective bumpers of said truck, parallel with the side frames thereof, said box girder comprising a hollow longitudinal beam having a plurality of transverse brackets formed integral therewith which are adapted to support a motor.

7. The combination with an electric-locomotive truck, of a motor-suspension means comprising a box girder disposed longitudinally and centrally with reference to the side frames of the truck and having transverse connections to said side frames and transversely extending brackets for mounting a plurality of drive motors.

8. The combination with an electric-locomotive truck, of a motor-suspension means comprising a box girder disposed longitudinally and centrally with reference to the side frames of the truck and having transverse connections to said side frames and transversely extending brackets for yieldingly mounting a drive motor, said box girder having a center bearing mounting for the cab frame and constituting a conduit to supply the motors with a cooling fluid.

9. The combination with an electric-locomotive truck, of a motor-suspension means comprising a box girder disposed longitudinally and centrally with respect to the side frames of the truck and secured to the bumper frames thereof, a plurality of transversely disposed reinforcing members secured to said girder and side frames and a plurality of transversely extending brackets for yieldingly mounting a plurality of drive motors.

10. The combination with a locomotive cab, of a pair of articulated trucks, means on each of said trucks for yieldingly supporting a plurality of drive motors, one end of each of which is partially supported by an axle bearing on the corresponding drive axle, said means comprising a box girder extending from the bumper frames of said trucks and reinforced by cross-ties extending to the side frames of the trucks, a center bearing on said girder to provide a swivel connection between the respective trucks and the cab, and a plurality of brackets on said girder for securing springs and bolts by which the drive motors are suspended.

In testimony whereof, I have hereunto subscribed my name this 18th day of December, 1922.

NORMAN W. STORER.